Aug. 19, 1952  C. E. BARTON  2,607,213
SHOT PEENING TEST FIXTURE
Filed Jan. 24, 1949  2 SHEETS—SHEET 1

INVENTOR.
Carl E. Barton
BY Strauch & Hoffman
Attorneys

Aug. 19, 1952     C. E. BARTON     2,607,213

SHOT PEENING TEST FIXTURE

Filed Jan. 24, 1949     2 SHEETS—SHEET 2

INVENTOR.
Carl E. Barton
BY Strauch & Hoffman
Attorneys

Patented Aug. 19, 1952

2,607,213

UNITED STATES PATENT OFFICE 2,607,213

SHOT PEENING TEST FIXTURE

Carl E. Barton, Detroit, Mich., assignor to The Timken-Detroit Axle Company, Detroit, Mich., a corporation of Ohio Application January 24, 1949, Serial No. 72,320

8 Claims. (Cl. 73—12)

This invention relates generally to the shot peening of axle shafts and more specifically to a fixture for holding test strips for measuring the intensity of the shot peening.

It is conventional practice to feed axle shafts to a shot peening machine by a conveyor system. In this machine the axle shaft surface is subjected to shot blasts to densify and harden it. At established intervals a test fixture that can be handled like an axle shaft is run through the machine with test strips secured to it that are subjected to the same shot blasts as the axle shafts. An inspection of the blasted test strips enables the operator to determine the effect of the shot peening on the axle shafts and thus to judge the efficiency of the operation.

Usually such a test fixture is made by taking a conventional axle shaft and machining a series of surface flats spaced about and along its periphery. Then test strips of steel are clamped upon the fixture surface at these flats, usually by machine screws that must be removed after the shot blasting operation to remove and inspect the strips properly and to ready the fixture for another test operation.

This conventional type of fixture has many disadvantages and usually requires a different fixture for each different size and type of axle shaft to be peened. Considerable time is required for the clamping and unclamping of the test strips as at least four screws must be separately inserted or removed. The slotted heads of the clamping screws become so battered during the shot blast that they must be replaced after each test. Often these screws cannot be removed from the fixture without a drilling operation. The exposed machined flats also become so battered after constant use of the fixture that the test strips do not seat properly and the entire fixture must be replaced.

It is the major object of this invention to provide a shot peening test fixture whereon the test strips are clamped in a novel manner.

It is a further object of this invention to provide a novel fixture which may be used for testing the shot peening effect on axle shafts of various sizes.

It is a further object of this invention to provide a shot peening test fixture having novel test plate clamping device that is applied or released by manipulation of a single member.

It is another object of this invention to provide a novel shot peening test fixture having a plurality of spaced clamp members adapted to secure a test strip to the fixture, all of the clamp members being simultaneously operable by a single adjustment member which is protected during the test operation.

Another object of this invention is to provide a novel shot peening test fixture having a replaceable bed plate to which test strips are releasably secured.

These and other objects will become apparent as the description proceeds in connection with the appended claims and the annexed drawings wherein:

The specification now proceeds with continued reference to the drawings wherein like reference numerals designate like parts throughout the several figures.

Figure 1:
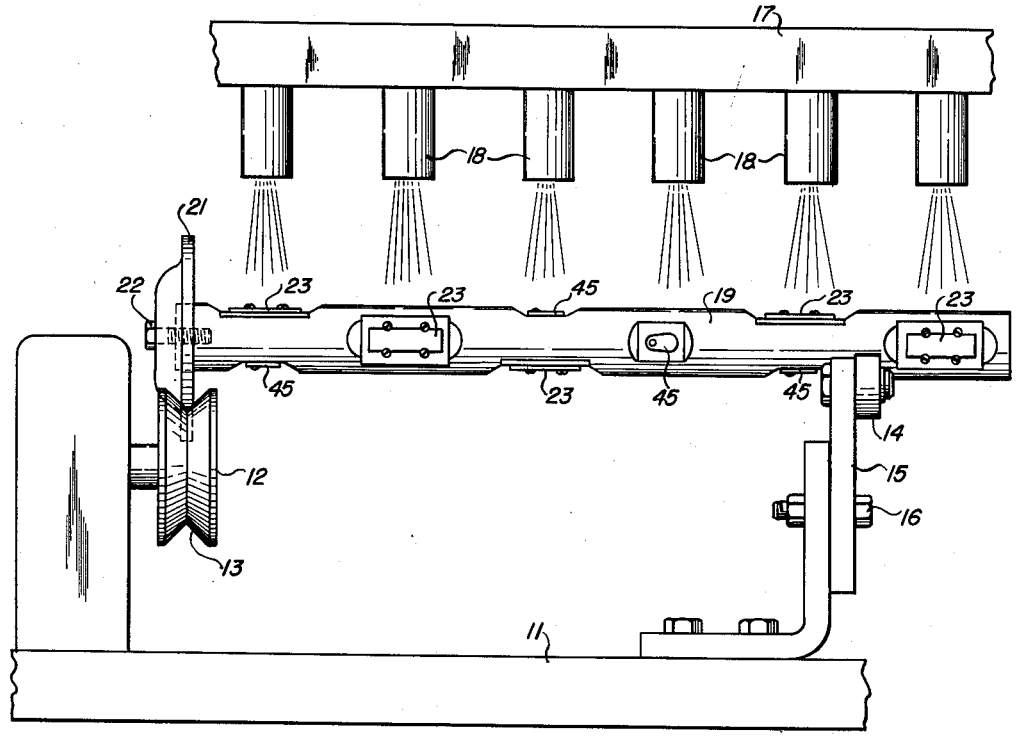
Figure 1 is a partially diagrammatic elevation illustrating a test fixture made according to a preferred embodiment of this invention disposed in shot peening apparatus.
Figure 2:
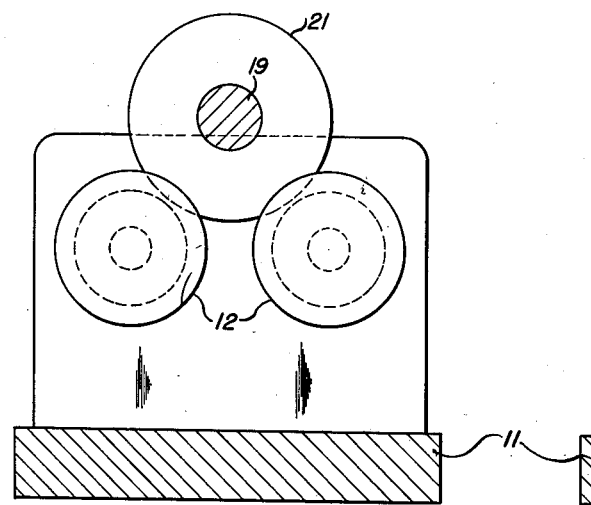
Figure 2 is an end elevation illustrating the driving rollers of the shot peening apparatus.
Figure 3:
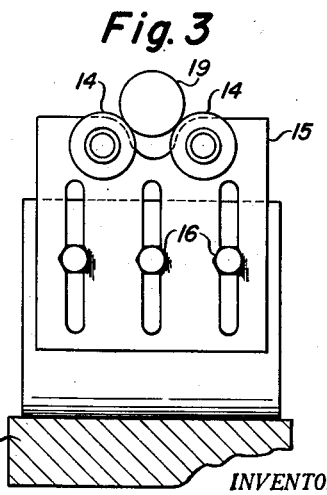
Figure 3 is an opposite end elevation illustrating the idler rollers of the shot peening apparatus.

Shot peening apparatus of conventional design is illustrated in Figure 1. The work support portion comprises a base 11 having at one end a pair of motor driven rollers 12 of substantial width and provided with large V-shaped peripheral grooves 13. The opposite end of base 11 is provided with a pair of cooperating cylindrical idler rollers 14 carried by a bracket 15 having a slot and bolt adjustment at 16 whereby the height of the rollers may be varied to locate the axle or test fixture axis truly horizontal during the shot peening operation.

A nozzle carrier 17 is disposed above the base centered with a vertical plane midway between the idler and driven roller axes. Carrier 17 is mounted in a conventional manner (not shown) for reciprocation parallel to the axes of the rollers. A plurality of discharge nozzles 18 are provided on the carrier and each project a stream of shot toward any object supported by the rollers on the base.

In conventional operation, an axle shaft to be peened is placed in the shot peening apparatus with its flange supported by the driving rollers 12 and its opposite end supported by the idler rollers 14. The idler rollers are adjusted to a height that will place the axis of the axle shaft in a horizontal plane with its periphery at uniform distances from the several nozzles. To test the effect of the shot peening operation a fixture shaped like an axle shaft and carrying a plurality of test strips may be subjected to the shot peening process in the same manner as an axle shaft. The test strips may then be removed from the fixture and examined in the usual manner.

The test fixture of the invention comprises a cylindrical body 19 having at one end a detachable disc-like flange 21 secured to it as by a bolt 22. Flange 21 is interchangeable with other flanges of different diameters whereby a flange may be selected to maintain the axes of test fixture shafts of various diameters horizontal.

A plurality of steel test strips 23 are preferably mounted at uniformly spaced positions along and about the length of body 19 so as to maintain the fixture in substantially balanced condition for easier rotation.

Figure 4:
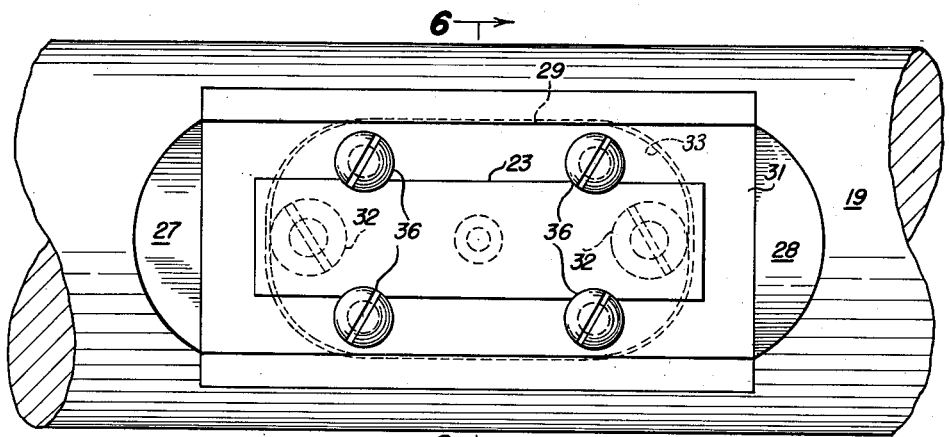
Figure 4 is an enlarged fragmentary plan view illustrating a test strip clamped to the test fixture.
Figure 5:
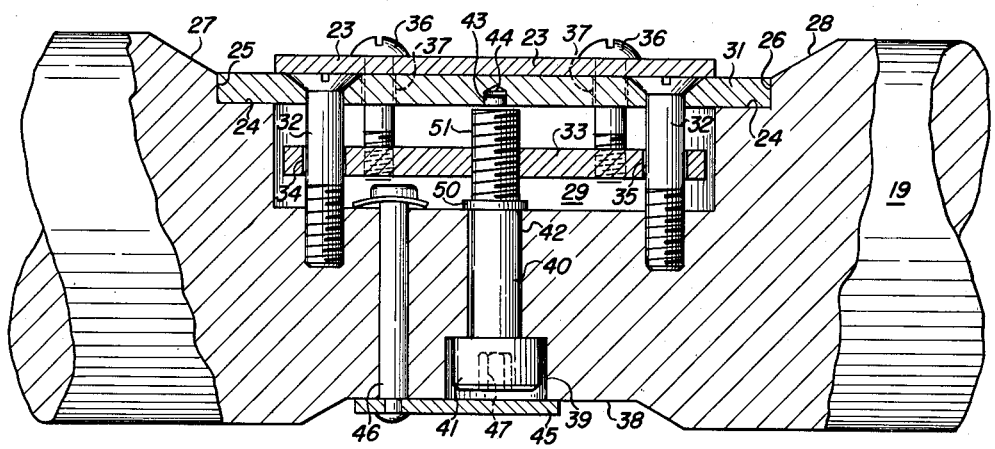
Figure 5 is an elevation partly in section through the fixture portion of Figure 4 illustrating clamp details.
Figure 6:
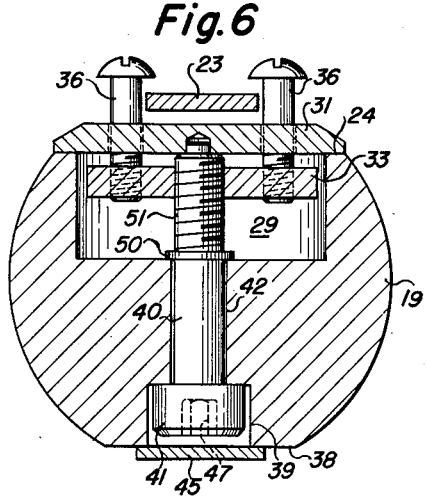
Figure 6 is a section substantially on line 6—6 of Figure 4 showing the test strip released.
Figure 7:
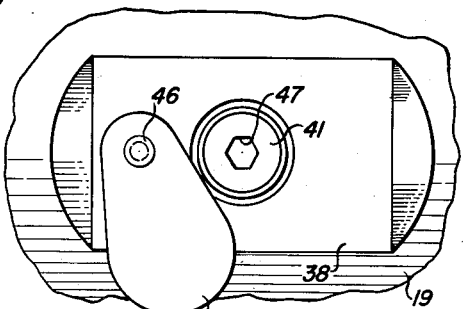
Figure 7 is a plan view of the opposite side of the fixture illustrating the end of the adjusting screw and its cover.

At each location on the body 19 where a test strip is to be secured, a flat surface 24 is machined in a plane parallel to the body axis as illustrated in Figure 4. At the opposite ends of each surface 24 are machined parallel surfaces 25 and 26 that are disposed at right angles to surface 24, and these parallel surfaces are connected to the periphery of body 19 by inclined oppositely sloping surfaces 27 and 28 respectively. A generally oval flat-bottomed recess 29 is formed in body 19 beneath flat surface 24 and each recess is covered by a flat plate 31 that rests on surface 24 between end surfaces 25 and 26 and is secured to the body as by screws 32 that extend through recess 29. Plate 31 provides a test strip bed. Screws 32 have flat heads which are countersunk to lie flush with or slightly below the upper flat surface of plate 31 as illustrated in Figure 5. The shanks of screws 32 within recess 29 are cylindrical and smooth for a purpose to be described.

Within recess 29 is disposed a flat carrier plate 33 that is formed near adjacent ends with smooth bores 34 and 35 that interfit slidably with the shanks of screws 32. Screws 32 therefore serve as slide guides for carrier 33 as will appear. It is not necessary that the slide guides for carrier 33 be the same means as that which secures plate 31 over the recess but the double function of screws 32 in the preferred embodiment is very desirable.

Upstanding rigidly from carrier 33 are four screws 36 that have cylindrical shanks extending with sliding fit through four cooperating bores 37 in relatively fixed plate 31. The enlarged flat-bottomed heads of screws 36 are disposed above plate 31, preferably all at the same distance above the top surface of plate 31.

The test strip 23 is of such size as to underlie the heads of all four screws 36 so that the test strip may be tightly clamped upon plate 31 by downward displacement of carrier 33 within recess 29. While members 36 need not be screws, they are preferably so.

Opposite recess 29 the side of body 19 is machined to provide a flat surface 38 parallel to plate 31 and formed with a central recess 39. An adjustment screw 40 having its head 41 in recess 39 has a cylindrical shank passing through a bore 42 in body 19 and through recess 29 to terminate in a reduced end 43 piloted in a bore 44 in the bottom of plate 31. Screw 40 is retained against axial movement during rotation by means of head 41 and snap ring 50 within recess 29. Within recess 29 adjusting screw 40 is threaded at 51 and engaged with a threaded bore in carrier 33 whereby rotation of screw 40 displaces the carrier axially of the screw within recess 29. The head 41 of screw 40 is protected from the shot peening blast by a cover 45 that swings about a pivot pin 46. The wrench socket 47 in screw head 41 is thereby protected or made accessible for the clamping or unclamping operations by disposition of cover 45.

It is readily apparent that a test strip 23 may be quickly and securely clamped to plate 31 by rotation of adjustment screw 40 in a manner that will move carrier 33 toward the bottom of recess 29. The heads of clamp members 36 are simultaneously pulled toward plate 31 thereby securely and uniformly clamping test strip 23 to plate 31. A number of test strips may be secured to or removed from the fixture in a short time. Although the heads of screws 36 become quickly mutilated by the shot blasts this is of no consequence since these screws need not be turned to release the test strip.

Plates 31 although partly protected by the strips 23, will become worn from the shot peening and eventually may not permit new test strips to seat properly. Then plates 31 may easily be removed from the fixture and replaced by new ones. The slotted heads of screws 32 are protected by the test strip. I have therefore provided a shot peening test fixture wherein each test strip is clamped uniformly at four points by manipulation of a single member which latter is protected from the shot blast so that the insertion and removal of test strips is speedily accomplished. Much time is saved by the use of the fixture and its worn parts may be speedily replaced with new ones thereby eliminating the continual need for completely new fixtures.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A test fixture for determining the effect upon the surface of a body of a shot peening operation wherein successive portions of the surface of the body are presented for subjection to shot peening; said fixture comprising a body of substantially the same size and shape and adapted to have its surface subjected to shot peening in substantially the same manner as the shot peened bodies, the surface of said test fixture body having dispersed substantially uniformly thereon means defining test strip clamping stations, each said clamping station having a test strip bed secured to said body, clamping means coacting with said bed for holding down a test strip, and means within said body and accessible only at the opposite side of said body for manipulating said clamping means to release or hold a test strip.

2. In the test fixture defined in claim 1, an operating head for said last means recessed into said opposite side of said body, and a removable cover for said head.

3. In the test fixture defined in claim 1, said clamping means comprising a plurality of spaced strip engaging parts and said clamp manipulating means comprises a single movable control member.

4. In a test fixture as defined in claim 1, wherein said clamping means comprises a plurality of clamp elements extending through and projecting above the surface of said bed, a shiftable mount for said clamp elements below said bed, and wherein said manipulating means comprises means for moving said mount for applying and releasing said clamp elements.

5. In the test fixture defined in claim 4, said last means comprising a member operatively connected to said mount and mounted in said body and normally accessible for clamping adjustment only from the other side of said body.

6. A test fixture for holding test strips to be subjected to shot peening, comprising a body having a recess opening at one side, a plate closing said recess, a clamp carrier in said recess movable toward and from said plate, clamp elements on said carrier extending slidably through said plate and having clamping heads above said plate, and a clamp control member mounted on said body extending from an operating head at the opposite side of said body into operative connection with said carrier within said recess, said plate being secured to said body by elements with which said carrier has slide guide connection.

7. A test fixture for holding test strips to be subjected to shot peening comprising a body having a planar surface formed thereon and a recess opening in the planar surface, a bed plate on said planar surface overlying said recess, said plate having a plurality of openings therethrough spaced sufficiently far apart for a test strip to lie on said bed plate without overlapping said holes, clamp elements, extending through said holes in said plate and having clamping heads above said plate, means within said recess controlling axial movement of said clamp elements through said bed plate holes for moving the clamping heads toward or from said bed plate, and means for securing said bed plate to said test fixture body, said securing means being flush with the outer surface of said plate and positioned centrally of said clamping elements whereby the outer ends of said bed plate securing means will lie beneath the clamped object and be thus protected from mutilation during the peening operation.

8. A clamping fixture as defined in claim 7, wherein said clamp element movement control means comprises a clamp carrier mounted within said recess for movement toward and from said bed plate, and a means for adjusting the position of said carrier, and wherein the clamp carrier movement is guided by said bed plate securing means.

CARL E. BARTON.

REFERENCES CITED

The following references are of record in the file of this patent:

UNITED STATES PATENTS

| Number | Name | Date |
| --- | --- | --- |
| 849,758 | Titus | Apr. 9, 1907 |
| 1,412,170 | Dixon | Apr. 11, 1922 |
| 2,350,440 | Almen | June 6, 1944 |

OTHER REFERENCES

"Shot Peening," publication of the American Wheelabrator and Equipment Corp. Copyright 1946.